United States Patent
Dietl et al.

(10) Patent No.: US 6,955,770 B2
(45) Date of Patent: *Oct. 18, 2005

(54) DE-ICING AGENT AND METHOD FOR MELTING SNOW AND ICE

(75) Inventors: Harald Artur Dietl, Kastl (DE); Achim Stankowiak, Altoetting (DE)

(73) Assignee: Clariant GmbH, Frankfurt (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/498,576

(22) PCT Filed: Nov. 28, 2002

(86) PCT No.: PCT/EP02/13417

§ 371 (c)(1),
(2), (4) Date: Jun. 8, 2004

(87) PCT Pub. No.: WO03/054107

PCT Pub. Date: Jul. 3, 2003

(65) Prior Publication Data

US 2005/0006622 A1 Jan. 13, 2005

(30) Foreign Application Priority Data

Dec. 11, 2001 (DE) .......................... 101 60 724

(51) Int. Cl.⁷ ................................. C09K 3/18
(52) U.S. Cl. ............................................ 252/70; 106/13
(58) Field of Search ............................. 252/70; 106/13

(56) References Cited

U.S. PATENT DOCUMENTS

| | | | |
|---|---|---|---|
| 4,855,071 A | 8/1989 | Todd et al. |
| 4,954,279 A | 9/1990 | Frank et al. |
| 5,238,592 A | 8/1993 | Stankowiak et al. |
| 5,366,654 A | 11/1994 | Van den Brom et al. |
| 5,376,293 A | 12/1994 | Johnston |
| 5,435,930 A | 7/1995 | Chan et al. |
| 5,968,407 A | 10/1999 | Archambault et al. |
| 2004/0119043 A1 | 6/2004 | Dietl |

FOREIGN PATENT DOCUMENTS

| | | |
|---|---|---|
| CA | 2099483 | 1/1994 |
| DE | 40 34 217 | 5/1991 |
| EP | 0483 721 | 5/1992 |
| EP | 0579 014 A | 1/1994 |

*Primary Examiner*—Anthony J. Green
(74) *Attorney, Agent, or Firm*—Richard P. Silverman

(57) ABSTRACT

A de-icing agent containing a) between 45 and 55 wt. % of an alkali metal acetate, b) between 0.001 and 1.0 wt. % of a surfactant, c) between 0.0001 and 1.0 wt. % of an anti-foaming agent, d) between 0.001 and 1.0 wt. % of a corrosion inhibitor, and a sufficient amount of water to complete 100 wt. %.

11 Claims, No Drawings

DE-ICING AGENT AND METHOD FOR MELTING SNOW AND ICE

The present invention relates to a method of melting snow and/or ice on traffic areas by applying a deicing composition comprising an aqueous solution of alkali metal acetate, surfactant, and defoamer, and also to said deicing composition.

Snow and/or ice on roads, cycleways, footpaths, bridges, sports grounds, airfields and the like, referred to below as traffic areas, lead to a substantial impairment in traffic movement and in traffic safety. For this reason it has already long been known to apply water-soluble salts to such areas, the ice and snow melting (thawing) and forming an aqueous solution of the salt with a correspondingly lowered freezing point, or the freezing of precipitation, whether in the form of rain or snow or else simply in the form of freezing fog, being retarded or prevented by the aqueous solution of alkali metal carboxylates.

If salts are employed as deicing compositions the following requirements in particular should be met: the salt ought to cause less damage than existing thawing compositions, or no damage, let alone destruction, to the material of which the aforementioned areas are constructed—for example, concrete to DIN 18500. The salt employed ought to bring about rapid and very extensive thawing and/or, in the case of freezing precipitation, ought to prevent the traffic areas icing up. From the economic standpoint, finally, the thawing composition must offer a very good thawing performance and a long icing prevention time.

In view of the requirements mentioned, deicing compositions specified in the prior art as being advantageous include primarily alkali metal and alkaline earth metal chlorides and also alkali metal and alkaline earth metal salts of organic acids. For instance, U.S. Pat. No. 4,855,071 and EP-A-0 579 014 describe alkali metal and/or alkaline earth metal carboxylates having 1 to 4 carbon atoms, prepared by a particular process, as deicing compositions, and especially recommend essential calcium/magnesium acetate or sodium acetate.

EP-A-0 483 721 describes a liquid deicing composition composed essentially of water, an alkali metal and/or alkaline earth metal acetate, and specific corrosion inhibitors.

Furthermore, U.S. Pat. No. 5,376,293 also describes mixtures of different alkali metal and alkaline earth metal carboxylates having a carbon chain length of $C_1$ to $C_3$.

The known deicing compositions based on alkali metal chlorides or alkaline earth metal chlorides and based on alkali metal and/or alkaline earth metal carboxylates do not satisfactorily meet the requirements imposed on a deicing composition.

The action of a salt as a deicing composition is based, as already mentioned at the outset, on the lowering of the freezing point of water by the dissolved cations and anions and on the number of dissolved particles per unit volume. Also important, however, for the penetration rate and the thawing or melting capacity or icing prevention time of a thawing composition is the way in which the surface to be deiced is wetted. These factors result not only in an acceleration of the thawing or melting process during the thawing and/or melting of ice and/or snow but also in a reduction in the amount of thawing composition when thawing and/or melting ice and/or snow. Moreover, a liquid thawing composition better than those already described above ought to be characterized in that the liquid thawing material is free from solid constituents and in that it is stable on storage both at temperatures below 0° C. and at temperatures above the freezing point.

It is an object of the invention, accordingly, to develop, out of the multiplicity of deicing compositions in the form of alkali metal and/or alkaline earth metal chlorides and also alkali metal and/or alkaline earth metal carboxylates, a deicing composition which is highly effective at lowering the freezing point and which, in connection with the process of icing up due to freezing precipitation in the form of snow, rain or freezing fog or dew, offers a longer freeze protection time than comparable thawing compositions. This liquid deicing composition ought further to be particularly stable with respect to separation of the individual components. The deicing composition ought additionally, in particular, to be ecologically and physiologically unobjectionable, exert little if any corrosive effect on metals and the paving of traffic areas, and ought to be well tolerated biologically and be easy to handle and storable. Such a deicing composition would be desirable in particular in all those cases requiring long-lasting icing protection and requiring rapid and also prolonged thawing of ice and/or snow in the surrounding area.

It has surprisingly been found that a specific aqueous solution of alkali metal acetate in combination with a surfactant and defoamer and with a suitable corrosion inhibitor in small amounts, in particular an aqueous solution of the potassium salt of acetic acid and a suitable surfactant and defoamer and corrosion inhibitor in small amounts, has all of the required properties for application as a deicing composition.

The invention accordingly provides a deicing composition comprising
a) from 45 to 55% by weight of an alkali metal acetate,
b) from 0.001 to 1% by weight of a surfactant,
c) from 0.0001 to 1% by weight of a defoamer, and
d) from 0.001 to 1% by weight of a corrosion inhibitor
   and also water to 100% by weight.

The invention further provides a method of melting snow and ice on traffic areas by applying from 5 to 100 g/m² of the deicing composition of the invention to the traffic area.

The amount of deicing composition to be applied depends in particular on the external temperature and on the amount of ice and/or snow present and is preferably from 15 to 80 g/m² of traffic area. The deicing composition can be applied using the standard spreading vehicles.

The deicing composition of the invention includes an alkali metal acetate, potassium acetate in particular. The amount of constituent a) is preferably between 47 and 53% by weight, in particular between 48 and 52% by weight.

The deicing composition of the invention preferably contains from 0.01 to 0.5% by weight, in particular from 0.02 to 0.2% by weight, of one or more surfactants. Preferred surfactants used are alkyl (poly)glycosides. Their alkyl groups include preferably 8 to 16 carbon atoms.

The deicing composition of the invention contains preferably from 0.0002 to 0.1% by weight, in particular from 0.0005 to 0.01% by weight, of one or more defoamers. Defoamers used are preferably polysiloxanes, in particular polydialkylsiloxanes, especially polydimethylsiloxanes.

The deicing composition of the invention contains preferably from 0.01 to 0.7% by weight of one or more corrosion inhibitors. Corrosion inhibitors used are preferably alkali metal phosphates, alkali metal borates, and alkali metal silicates.

EXAMPLES

The icing prevention time was determined in analogy to ISO 11078 at the particular air temperature and concrete slab temperature indicated. In this case, however, icing was carried out using not electropolished aluminum sheets but instead concrete slabs measuring 25 cm×25 cm×5 cm with an inclination angle of 1°. 1.857 g of the specified deicing composition were applied to the slabs, corresponding to an application rate of 30 g of deicer/m². The measure used for the icing prevention time is a period of time until the concrete slab starts to ice up.

TABLE 1

Activity of deicing compositions

| Example | Temp. °C. | Deicer | Irrigation rate g/(dm² · h) | Icing prevention time min |
|---|---|---|---|---|
| 1 | −5 | E | 5.8 | 26 |
| 2 | −5 | E | 7.4 | 19 |
| 3 | −5 | E | 8.3 | 14 |
| 4 | −15 | E | 8.1 | 13 |
| 5 | −15 | E | 8.6 | 14 |
| 6 | −15 | E | 9.4 | 9.5 |
| 7 (comp.) | −5 | potassium formate | 5.5 | 22 |
| 8 (comp.) | −5 | potassium formate | 7.6 | 12 |
| 9 (comp.) | −15 | potassium formate | 8.4 | 10 |
| 13 (comp.) | −15 | potassium acetate | 8.9 | 7.5 |

E = inventive deicing composition, consisting of a 50% strength by weight aqueous solution of potassium acetate with 0.1% by weight C8 to C16 alkyl glycoside, 0.005% by weight polydimethylsiloxane, and 0.3% by weight $K_3PO_4$.

For comparison purposes, potassium formate and potassium acetate were used without additives.

What is claimed is:

1. A deicing composition comprising:
   a) from 45 to 55% by weight of an alkali metal acetate,
   b) from 0.001 to 1% by weight of an alkyl (poly) glycoside,
   c) from 0.0001 to 1% by weight of a defoamer,
   d) from 0.001 to 1% by weight of a corrosion inhibitor, and water to 100% by weight.

2. The deicing composition as claimed in claim 1, wherein the amount of constituent a) is between 47 and 53% by weight.

3. The deicing composition as claimed in claim 1, wherein the amount of constituent a) is between 48 and 52% by weight.

4. The deicing composition as claimed in claim 1, wherein constituent a) is potassium acetate.

5. The deicing composition as claimed in claim 1, wherein the amount of constituent b) is between 0.01 to 0.5% by weight.

6. The deicing composition as claimed in claim 1, wherein the amount of constituent c) is between 0.0002 to 0.1% by weight.

7. The deicing composition as claimed in claim 1, wherein constituent c) is a polysiloxane.

8. The deicing composition as claimed in claim 1, wherein the amount of constituent d) is between 0.01 to 0.7% by weight.

9. The deicing composition as claimed in claim 1, wherein constituent d) is selected from the group consisting of an alkali metal phosphate, alkali metal borate, alkali metal silicate and mixtures thereof.

10. A method of melting snow or ice on a traffic comprising the step of applying from 5 to 100 g/m² of the deicing composition as claimed in claim 1 to the traffic area.

11. A method of melting snow or ice on a surface comprising the step of applying from 5 to 100 g/m² of the deicing composition as claimed in claim 1 to the surface.

* * * * *